United States Patent Office 3,709,845
Patented Jan. 9, 1973

3,709,845
MIXED DISCONTINUOUS FIBER REINFORCED
COMPOSITES
Kamel Boustany and Aubert Yaucher Coran, Akron, Ohio, assignors to Monsanto Company, St. Louis, Mo.
Continuation-in-part of application Ser. No. 29,033, Apr. 16, 1970. This application July 6, 1971, Ser. No. 159,955
Int. Cl. B32b 5/08; B60c 1/00
U.S. Cl. 260—17.4 BB                     11 Claims

ABSTRACT OF THE DISCLOSURE

Composites of organic polymer matrix having dispersed therein a mixture of discontinuous fibers of different widths or lengths are described.

This application is a continuation-in-part of application Ser. No. 29,033, filed Apr. 16, 1970, the disclosure of which is incorporated herein by reference.

The present invention relates to composites of discontinuous fiber reinforced organic polymer matrices. It particularly relates to high modulus vulcanized composites of rubber and other elastomers having dispersed in the elastomeric matrix mixed discontinuous fiber comprising cellulose of different aspect ratios or cellulose in admixture with a non-cellulosic fiber.

BACKGROUND OF THE INVENTION

Since its inception, the rubber industry has incorporated cellulose fibers into rubber as cheap fillers. Cellulose adds some stiffness and increases dimensional stability. The preparation of strong, high modulus rubber vulcanizates by reinforcement of cheap cellulose fibers remained an intriguing possibility impeded by the difficulty of incorporating cellulose into rubber uniformly without injuring it. Cellulose fibers tend to cling together and remain in bundles upon mixing into massed rubber while the individual fibers and bundles break up into shorter lengths.

However, strong, high modulus cellulose composites are described in our aforesaid earlier appplication characterized by having dispersed in vulcanized elastomer matrix discontinuous cellulose fiber of average aspect ratio within the range of 20–350 bonded to the matrix. Composites are described wherein the Young's modulus is ten times the matrix modulus or higher and the yield strength of the bonded composite exceeds by more than 25% the yield strength of the corresponding unbonded composite. The fiber usually is within the range of 2–75% by volume of the matrix. The modulus approaches a plateau above 75% volume loading and, if it is desired to orient the fiber in the matrix, a higher degree of orientation is obtainable at loading of 5% by volume and above.

The aspect ratio of the cellulose strongly affects the modulus obtainable. Examination of the modulus as a function of the aspect ratio in rubber composites containing discontinuous cellulose fiber reveals that as one ascends the scale of increasing aspect ratio the modulus is increasing rapidly at an aspect ratio of 20 and continues to rise up to an aspect ratio of 200–350. An aspect ratio of 50–200 is particularly desirable. Fibers of widely different aspect ratios within the aforesaid range may be used and for some purposes a mixture is advantageous. For example, a mixture of fiber aspect ratios 50 and 200. The advantages of mixed fibers are hereinafter elucidated and the concept extended to mixtures of non-cellulosic fibers.

SUMMARY OF THE INVENTION

Improved compositions are provided comprising thermoplastic polymer matrix having dispersed therein 2–75% by volume of a mixture of discontinuous fiber filaments 10–90% by weight of which mixture is unregenerated cellulose fiber having an aspect ratio within the range of 20–350 and 90–10% by weight of which is fiber filament having an aspect ratio within the range of 10–3000, the average widths of said fibers either differing by at least 10 microns or the average lengths differing by a factor of at least two. More limited aspects of the invention comprise thermoplastic polymer matrix having dispersed therein a first component of 25–100% of the matrix of unregenerated wood cellulose average aspect ratio 20–200 and a second component of 5–75% of the matrix of fiber filament aspect ratio 10–2500 which components differ in width or length in the aforesaid manner. They may of course differ in both respects. The fibers are preferably directionally oriented by which is meant that more of the fibers have their longitudinal axis in one direction than in any other direction. Unregenerated fiber composites wherein the cellulose is essentially uniform and is directionally oriented reach a maximum longitudinal tensile strength at a fiber loading which depends upon the matrix modulus. If the loading required to attain the maximum tensile is considered optimum, increasing loadings beyond the optimum results in decreasing tensile strengths. In accordance with this invention, it has been found that the decreasing tensile strength is overcome by using for that portion of the loading above the cellulose optimum, cellulose of a different aspect ratio or a non-cellulosic fiber differing in the manner described. In other words, the portion of cellulose above the optimum is replaced by a different cellulose or by a different fiber altogether, for example, nylon, steel or glass. As will appear presently, mixed fiber composites are obtained which have tensile strength significantly higher than attainable with cellulose alone and retain high Young's modulus. Similarly, if the total fiber loading is maintained at the optimum for cellulose and part of the cellulose is substituted by a different fiber, the tensile strength of the composite may be significantly increased. The improvements are apparently due to a reduction of the fiber's end effect. Fibers tend to line up in rows and the mixtures are believed to produce a more random distribution of the end position so that there is more overlapping of the fiber ends. Fatigue resistance as well as strength is improved. The invention, however, is not limited to any theory or explanation of the improvements attained.

The degree of improvement will of course vary with the particular fibers loading and the relationship of the fiber widths and lengths. For the most part, the preferred composites of this invention comprise organic polymer matrix having dispersed therein 25–100% by weight of the polymer of directionally oriented discontinuous mixed fiber of which 25–90% is unregenerated cellulose of average aspect ratio 20–350 and average width of 5–20 microns and 75–10% of a second fiber filament of average width 3–200 microns and aspect ratio of 10–2500, said second fiber differing in average width from the unregenerated cellulose by 10 microns or more or in average length by a factor of two or more. Reference is made to fiber width instead of diameter because the fibers contemplated herein vary considerably in shape. Unregenerated cellulose fibers are more nearly elliptical than circular in cross section.

The invention will be described with particular reference to improving elastomeric unregenerated wood cellulose composites. The second fibers may be of identical chemical composition and differ only in physical properties, for example, unregenerated celluloses aspect ratios 10–40 and 80–150, respectively, and advantages obtained. A preferred group of fibers are filaments or individual fibers of commonly used tire cord material. In general, the fiber may be polyamide (nylon), cotton, rayon, polyester (Dacron), glass, saran, polyacrylic fiber, polyvinyl alcohol fiber, steel, aluminum, wool, hemp, cellulose acetate, boron, graphite, carbon fiber, aluminum alloy, titanium alloy, silicon carbide, leather, jute, ramie, sisal, silk or any of the various whisker fibers examples of which are boron whisker fiber, alpha silicon carbide whisker fiber and alumina whisker fiber. The steel fibers include the common 6-mil steel fiber either brass coated or uncoated and the more recent steel fiber castings of 3–5 mil diameter. A preferred fine steel fiber has an advantage diameter of about 3–6 mils aluminum content within the range of 0.3–3% and carbon content within the range of 0.1–1.5%.

Any organic polymer which provides a suitable matrix and is processable as a thermoplastic substance can be used as the substrate for holding the discontinuous mixed fiber. These comprise the general class of thermoplastic polymer of which elastomers are a preferred sub-group. A thermoplastic comprises linear molecular chains with the components of the chains covalently bonded and the chains bonded to other chains by weaker secondary forces. Illustrative examples are low density polyethylene, high density polyethylene, silicone rubber, ethylene-propylene rubber (EPR), ethylene-propylene terpolymer rubber (EPDM), natural rubber, styrene-butadiene rubber (SBR), acrylonitrile-butadiene rubber (NBR), polybutadiene rubber, cis-polybutadiene, trans-polybutadiene, acrylate polymers, urethane polymers, chlorosulfonated polyethylene, neoprene, polyisoprene, copolymers of butadiene with unsaturated ketones, butyl rubber, halogenated polyethylene, polyisobutylene, polystyrene, polyamides and acrylonitrile butadiene-styrene terpolymers (ABS).

DESCRIPTION OF PREFERRED EMBODIMENTS

Figure 1:
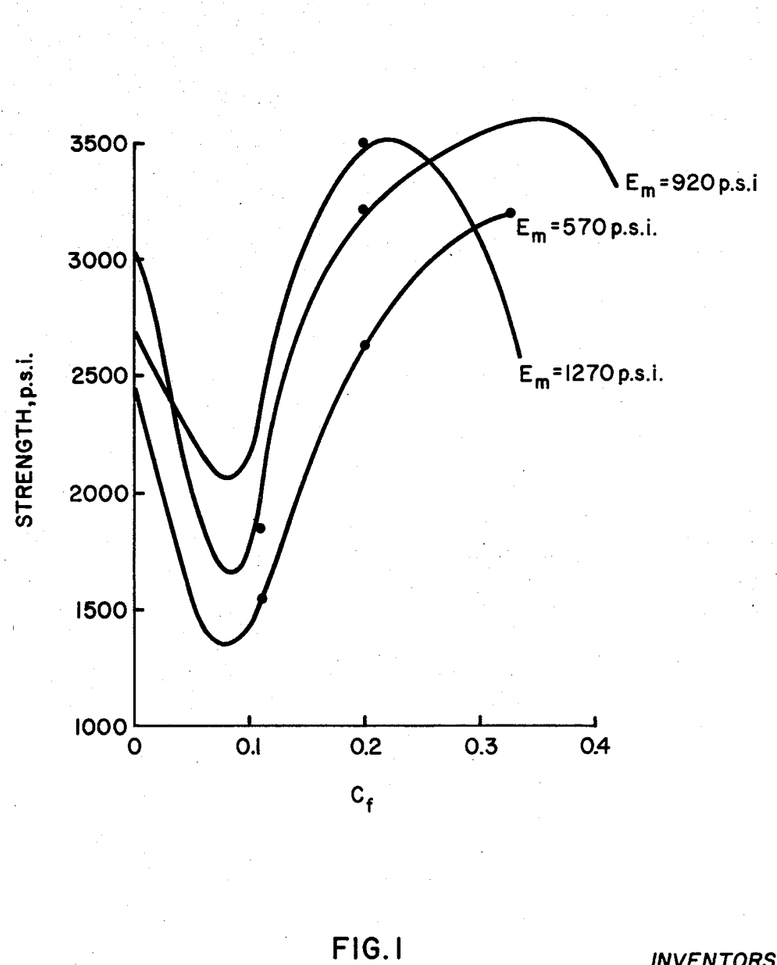
FIG. 1 is a graphic representation of longitudinal tensile strength in pounds per square inch for three different matrices as a function of cellulose loading.

The influence of cellulose loading on tensile strength is illustrated by FIG. 1 where tensile strength in the direction of fiber orientation is plotted against volume fraction, $C_f$, of hardwood kraft cellulose in composites of three different matrices having moduli, $E_m$, of 570 p.s.i., 920 p.s.i. and 1270 p.s.i., respectively. It will be noted that all three curves follow a similar pattern. At low loadings the curves dip sharply downward but soon climb steeply upward to a maximum tensile strength followed by a second sharp decline. The loading at which the maximum is reached or optimum loading appears to be a function of matrix modulus. It will be appreciated that FIG. 1 is characteristic of discontinuous fiber composites. At very low loading there is a decrease in tensile strength because for reinforcement there must be sufficient fiber in the composite for the individual fibers to affect their neighbors. Cheap cellulosic fiber may be used to load the composition beyond the minimum but not substantially beyond the maximum and the fiber supplemented by a metal, glass or different organic fiber. It would be preferred to load with an organic fiber to the point where the tensile strength of the composite at least returned to that of the matrix and then add the metallic, glass or different organic fiber. By minimum loading is meant the loading which provides the minimum tensile strength as one proceeds from zero loading to gradually increasing amounts. The decrease beyond the optimum loadings is overcome as described in the following embodiments of the invention.

Composites are prepared comprising a matrix in which the optimum loading of unregenerated cellulose is about 50 parts by weight. The total fiber loading is maintained at said optimum level and part of the cellulose replaced by a different fiber. Other composites are prepared in which the total loading is increased above 50 parts by weight by the addition of a different fiber to cellulose at the optimum loading. In both cases the matrix comprises:

Matrix A—
parts by weigh
Styrene-butadiene copolymer rubber (SBR 1502) __ 100
Carbon black _______________________________ 50
Silica (HiSil 233) ___________________________ 15
N - 1,3-dimethylbutyl-N'-phenyl-p-phenylenediamine
  antidegradant _____________________________ 2
Polymethylene polyphenyl isocyanate (PAPI) _____ 2.5
Sulfur _____________________________________ 1
N-t-butyl-2-benzothiazolesulfenamide ___________ 2
Zinc oxide _________________________________ 3
Stearic acid ________________________________ 2

The cellulose incorporated in the matrix is natural hardwood fiber pretreated to reduce fiber to fiber interaction and to reduce fiber breakage during incorporation into the rubber matrix by slurrying in water and treating with latex. Hardwood cellulose kraft fiber is slurried in water for 3 minutes at high speed in a Waring Blendor. There is then added styrene butadiene copolymer latex (SBR 1502) and the antidegradant after which mixing is continued for about 7 minutes at low speed. Rubber coagulates on the fiber during the mixing. The treated fiber which is now coated with rubber and antidegradant is filtered, allowed to dry and weighed. Taking into consideration the rubber present as a coating of the hardwood, additional rubber and the other ingredients including isocyanate bonding agent and silica or bonding adjuvant are mixed with the coated fiber in amounts necessary to prepare the aforedescribed matrix having hardwood cellulose fiber incorporated therein. Mixed fiber compositions are prepared by addition of short lengths of nylon filament (nylon 66) coated with RFL. RFL, an adhesive extensively used for cord bonding, is a mixture of butadiene-styrene-vinyl pyridine latex and the condensation product of resorcinol and formaldehyde in the presence of an alkali catalyst.

One series of composites is prepared containing nylon filaments approximately one inch long. Another series contains nylon ½ inch long, and finally composites are prepared containing nylon ranging from ⅛ to 3/16 inch long. The composites contain hardwood fiber of average width about 10 microns, aspect ratio about 100 and nylon filaments of 30 microns, diameter, aspects ratio 850, 425 and 50–100, respectively. A composite is also prepared containing a mixture of hardwood fiber and steel untreated of 6 mil diameter 0.125 in. long (aspect ratio 20). The fiber is oriented by repeated passes of the composite through a rubber mill, the rolls of which are set at 0.07 in. (1.8 mm.) and the composites cured by heating in a press at 153° C. for 35 min. Test specimens (T–50) are cut from the cured sheet product and pulled on an Instrom tensile testing machine in the direction of orientation at a loading speed of 0.1 in. per inch per minute. It will be appreciated that apparent higher tensiles are observed when loading rate of fiber composites is increased. The longitudinal tensile strength of a cellulose composite may increase from 3000 pounds per square inch (p.s.i. or lbs./in.²) to 5000 p.s.i. when the loading rate increases from 0.002 to 20 inches per inch per minute. Fiber content in parts by weight per 100 parts by weight of rubber and the corresponding tensile strength at break are summarized below. The third composite contains 1.5 PAPI instead of 2.5 PAPI but the difference is not significant.

| Parts by weight | | Tensile strength at break, lbs./in.² |
|---|---|---|
| Hardwood cellulose | Nylon, one inch | |
| 50 | 0 | 2,550 |
| 37.5 | 12.5 | 3,400 |
| 30 | 20 | 3,600 |
| 25 | 25 | 4,100 |
| 0 | 50 | 3,050 |
| 50 | 10 | 3,250 |
| 50 | 20 | 3,350 |
| 50 | 25 | 4,400 |
| 50 | 30 | 4,100 |
| | Nylon, ½ inch | |
| 50 | 15 | 4,050 |
| | Nylon, ⅛ to 1/16 inch | |
| 40 | 10 | 2,300 |
| 30 | 20 | 2,800 |
| 50 | 20 | 3,000 |
| 50 | 25 | 2,400 |
| 75 | 0 | 2,200 |
| | Steel, 0.125 inch | |
| 50 | 50 | 2,600 |

Although maximum tensile strength with cellulose alone is achieved at a loading of about 50 parts by weight, the foregoing results show that the tensile strength is increased either by replacing part of the cellulose with a different fiber or by adding a different fiber to the optimum amount of cellulose. Addition of 1 in. nylon filaments to 50 parts by weight of cellulose increases the tensile strength of the composite up to addition of 25 parts of nylon. The further addition of nylon does not increase the tensile strength although total loading of 80 parts results in tensile strength considerably higher than obtained with either 50 parts nylon alone or 50 parts cellulose alone. Addition of 15 parts of ½-inch nylon increases the tensile strength as much as the addition of 25 parts by weight of the 1-inch nylon. Replacing part of the cellulose with nylon filaments ranging in length from ⅛ to 1/16 inch results in improved tensile strength at a proportion of nylon to cellulose of 20/30. Somewhat higher tensile strengths than by replacing cellulose is achieved by addition of 20 parts of the short nylon to 50 parts of cellulose. Although further addition to provide a total fiber loading of 75 parts decreases tensile strength, it is still higher than that obtained with 75 parts of cellulose alone. The addition of 50 parts of short steel filament to 50 parts of cellulose is not accompanied by any loss of tensile strength.

Figure 2:
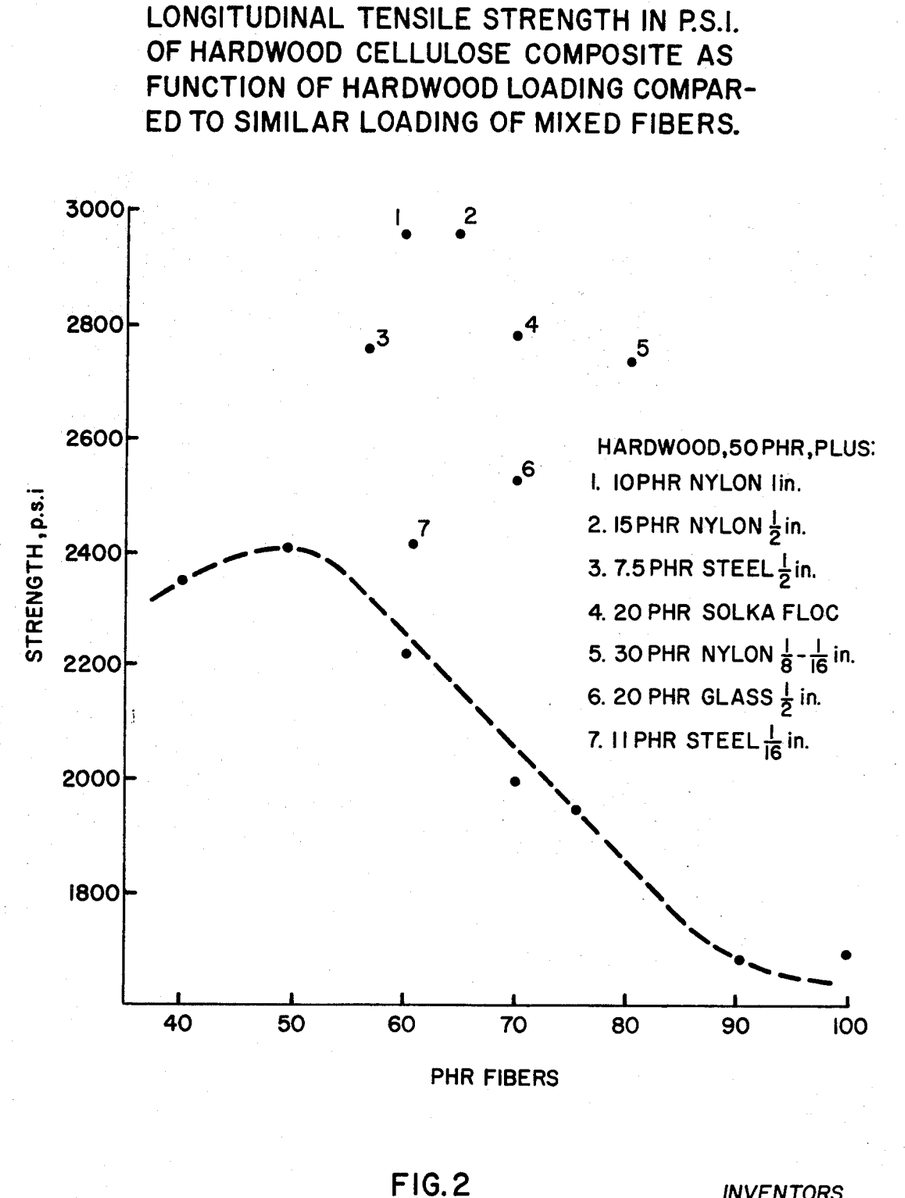
FIG. 2 is a graphic representation of longitudinal tensile strength in pounds per square inch as a function of cellulose loading in the high loading range as compared to similar loadings with mixed short fibers.

The effect on the tensile strength of the addition of a different fiber to a hardwood cellulose composite at optimum cellulose loading is illustrated graphically by the points above the curve in FIG. 2. The total fiber loading in parts by weight per hundred parts by weight of rubber is shown as abscissa and the tensile strength at break of the vulcanized composite as the ordinate. All of the mixed fiber compositions contain 50 parts by weight of hardwood kraft cellulose so that the total loading minus 50 represents the loading of the second fiber. The matrix is styrene-butadiene copolymer rubber composition described hereafter and the hardwood cellulose contained in the vulcanizates has an aspect ratio of about 100. The curve is for the same hardwood cellulose alone beginning at a loading just below the optimum loading to 100 parts by weight of hardwood cellulose and shows that the optimum is about 50 parts by weight. The steep drop in tensile above optimum hardwood cellulose loading indicated in FIG. 1 is apparent in FIG. 2 and shown to continue up to about 90 parts cellulose. The points represent the average of four independent determinations. The addition of a different fiber with 50 parts of hardwood cellulose produces composites having tensile strengths well above those of composites containing the same total fiber loading of hardwood cellulose alone. The sample of Solka Floc, a cellulose fiber, has an aspect ratio of 17 and measurements show that the aspect ratio is essentially unchanged in the composite. The nylon is 30 microns diameter nylon 66. The steel fiber is 3.3-mil diameter steel castings of low carbon steel containing aluminum within the range of 0.3–3% and carbon within the range of 0.5–1.5%. The ½ in. castings are annealed whereas the 1/16 in. castings are unannealed. Both are uncoated whereas the glass and nylon are coated with RFL. The glass is 5-micron diameter filament added in about 12 mm. lengths which bread up to .2–.4 mm. The composition of the matrix in the composites of FIG. 2 is as follows:

Matrix B—

| | Parts by weight |
|---|---|
| Styrene-butadiene copolymer rubber (SBR 1502) | 100 |
| N - 1,3 - dimethylbutyl - N' - phenyl - p - phenylenediamine antidegradant | 2 |
| Polymethylene polyphenyl isocyanate (PAPI) | 2.5 |
| Carbon black | 50 |
| Silica (HiSil 233) | 15 |
| Zinc oxide | 3 |
| Stearic acid | 2 |
| Sulfur | 2 |
| N-t-butyl-2-benzothiazolesulfenamide | 1 |

The cellulose added to the matrix is pretreated to reduce fiber to fiber interactions by stirring at 1500 revolutions per minute in styrene-butadiene copolymer latex containing the antidegradant, filtering and drying the treated fiber to obtain a product comprising 50 parts by weight of fiber, 2 parts by weight of antidegradant and 20 parts by weight of styrene-butadiene copolymer rubber which is mixed with the PAPI and 80 parts by weight of additional styrene-butadiene copolymer rubber. The aforesaid mixture is mixed in Brabender for a short time after which the remaining ingredients are added including a different fiber, if any. The fiber is oriented by repeatedly passing the composite through a rubber mill, the rolls of which are set at 0.07 in. (1.8 mm.) and the composite cured at 150° C. for 35 minutes in a press at 200–300 p.s.i.

An illustrative of improvements obtained by admixtures of different celluloses, composites are compounded comprising matrix B and 70 parts by weight of wood cellulose.* The cellulose is pretreated by coating with rubber and an antidegradant in the manner described by stirring the cellulose vigorously with butadiene styrene copolymer latex and the antidegradant. The coated cellulose is filtered and dried after which it is mixed with the PAPI and the remaining ingredients. The resulting composites are cured at 153° C. for 35 minutes and the tensile properties evaluated. The results obtained with hardwood cellulose, softwood cellulose and a mixture of each holding the total loading constant at 70 parts by weight are summarized below:

| Parts by weight | | Ultimate tensile strength of composite, lbs./in.² |
|---|---|---|
| Softwood pulp | Hardwood pulp | |
| 0 | 70 | 1,990 |
| 20 | 50 | 2,200 |
| 70 | 0 | 2,050 |

---

*"Wood cellulose," "pulp" and "hardwood" herein all refer to fiber.

As illustrative of results in oil-extended natural rubber matrices hardwood cellulose fiber are incorporated into matrices comprising:

| | Matrix, parts by weight | |
|---|---|---|
| | C | D |
| Smoked sheets | 100 | 100 |
| Carbon black (ISAF) | 45 | 50 |
| Zinc oxide | 3 | 3 |
| Stearic acid | 2 | 2 |
| Aromatic processing oil | 5 | 5 |
| Resorcinol | 2.5 | 3.5 |
| Hexamethylenetetramine | 1.6 | 3.5 |
| Silica (HiSil 233) | 15 | 7.5 |
| N-t-butyl-2-benzothiazolesulfenamide | 0.5 | 1.2 |
| Sulfur | 2.2 | 2.5 |
| N-1,3-dimethylbutyl-N'-phenyl-p-phenylenediamine antidegradant | 2 | 1 |

The hardwood is pretreated by coating with styrene-butadiene copolymer rubber and the antidegradant as previously described. Tensile strength is substantially unchanged upon increasing the hardwood loading from 100 to 125 parts by weight and then drops precipitously when hardwood loading is increased to 150 parts by weight but replacement of 25 parts by weight of hardwood with 1 in. nylon 30 microns diameter coated with RFL or ½ in. polyester 30 microns diameter coated with RFL in the composite having 125 parts by weight total loading provides a composite which is significantly improved in tensile strength and retains a high Young's modulus. Reversing the proportions of hardwood and polyester employed in Matrix D increases tensile strength and elongation significantly while retaining a modulus approaching that obtained with 150 parts by weight of hardwood. In these matrices the aspect ratio of the hardwood after processing is about 150. The results are summarized in the table below where Matrix C is used except in the case of 25 parts hardwood/100 parts polyester:

| | Fiber loading, parts by wt. | Tensile strength at break (p.s.i.) | Elongation at break, percent | Young's modulus (p.s.i.) |
|---|---|---|---|---|
| Hardwood | 100 | 2,900 | 4.3 | 73,400 |
| Do | 125 | 3,000 | 8.1 | 77,000 |
| Do | 150 | 1,100 | 2.5 | 46,100 |
| Hardwood and nylon | 100 / 25 | 5,250 | 13.2 | 68,400 |
| Hardwood and polyester | 100 / 25 | 3,550 | 9.3 | 62,250 |
| Do | 25 / 100 | 6,200 | 30.0 | 42,000 |
| Hardwood and cotton | 70 / 20 | 4,450 | 7.5 | 80,000 |
| Hardwood and asbestos | 75 / 25 | 4,500 | 6.0 | 87,000 |

The cotton is ½ in. lengths untreated, width about 14 microns. The asbestos is resin grade asbestos comprising fiber of 5–8 microns, widths in short lengths (aspect ratio 10–20).

Composites in which the matrix is a mixture of natural rubber and styrene-butadiene copolymer rubber are prepared wherein the matrix comprises:

| | Matrix, parts by weight | |
|---|---|---|
| | E | F |
| Styrene butadiene copolymer rubber (23.5% bound styrene) | [1] 68.8 | [2] 80.0 |
| Natural rubber | 50 | 20 |
| Carbon black (FEF) | 50 | 25 |
| Zinc oxide | 3 | 3 |
| Stearic acid | 2 | 2 |
| Sulfur | 2 | .2 |
| Santocure NS | 1 | 1 |

[1] Oil extended, contains about 37.5% highly aromatic oil (SBR 1712).
[2] SBR 1502.

The bonding ingredients added to the matrix and fiber loading are variable as indicated below where as before the parts are by weight:

| | Matrix | | | | |
|---|---|---|---|---|---|
| | E | E | E | E | F |
| Composite No | 503A | 526A | 524A | 523A | 402A |
| Resorcinol derived resin [1] | 5 | 7.5 | | | |
| Hexamethylenetetramine | 1.6 | 1.6 | 2.5 | 2.5 | 1.6 |
| Fiber | 100. | 125. | 100. | 125. | 100. |
| Silica (HiSil 233) | | | 5 | 5 | 15. |
| Resorcinol | | | 5 | 5 | 2.5 |

[1] A solution of 220 grams (two moles) of resorcinol in 400 ml. of xylene is prepared and heated to 100–120° C. Allyl chloride (two moles) is then added and after the reaction is complete the upper solvent layer is decanted and the residual solvent is removed by heating the remaining reaction mixture in vacuo.

The identity of the fiber, their ratios, and the properties of the composites after vulcanizing by heating in a mold for 25 minutes at 153° C. are summarized in the table below. The hardwood is unregenerated hardwood cellulose filaments which after processing are present in the composite as dispersed filaments of an average aspect ratio af approximately 150. The rayon is rayon filament of about 12 microns diameter in lengths of ½ to 1 inch and is unchanged on processing (aspect ratio 1000–2000). The nylon is nylon 66 filament 30 microns diameter in lengths of ¹⁄₁₆–⅛ in. and remains unchanged on processing (aspect ratio 50–100). The asbestos is fiber of 5–8 microns diameter in lengths of about ½ in. (aspect ratio about 2500). The glass is 5–6 micron filament added in lengths of ½ in. but after processing is about 0.3 mm. long so that the glass in the cured composite has an aspect ratio of about 50–60. The polyester is polyester cord ½ in. long which after processing is dispersed as filaments ½ in. long and 30 microns diameter.

| Composite number | Fiber | Parts by weight | Tensile strength at break (p.s.i.) | Elongation at break, | Young's modulus (p.s.i.) |
|---|---|---|---|---|---|
| 503A | Hardwood / Asbestos | 25 / 75 | 3,400 | 10 | 47,000 |
| 526A | Rayon / Glass | 100 / 25 | 3,150 | 12.5 | 53,500 |
| 524A | Nylon / Glass | 60 / 40 | 3,050 | 19 | 27,500 |
| 523A | Nylon / Asbestos | 100 / 25 | 3,650 | 17.5 | 38,500 |
| 402A | Hardwood / Polyester | 50 / 50 | 4,800 | 20 | 50,500 |

It will be noted that only 25 parts by weight of hardwood with 75 parts by weight of asbestos yields a composite having Young's modulus in the range of 50,000 p.s.i. but modulus is significantly lower where neither component is cellulosic.

It will be appreciated that longer fiber filaments are dispersible into an elastomeric matrix when added along with unregenerated wood cellulose fiber of aspect ratio 20–350 than would otherwise be the case. For example, cotton fiber of aspect ratio above 300 disperses satisfactorily when incorporated into a rubber along with wood cellulose and in general it is preferred to add the wood cellulose first followed by the longer fiber. It is desirable that cotton above aspect ratio 350 constitute 10–50% by weight of the wood cellulose. For some purposes addition of short fiber filaments is advantageous. In accordance with the usual definition, fiber is assumed to begin with materials having an aspect ratio of at least about 10. As noted at the outset, an aspect ratio of 50–200 is particularly desirable for high modulus elastomeric cellulose composites. However, green elongation is in general inversely proportional to aspect ratio. It can be increased and high modulus retained using cheap, preferably organic, fiber of aspect ratio 10–50 in amount at least equal to the equilibrated loading (amount required to bring the tensile of the vulcanizate back to the matrix tensile) but below optimum loading together with a fiber of aspect ratio 50–3000 or 100–3000.

The increase in green elongation is illustrated in a matrix comprising:

Matrix G—Parts by weight

| | |
|---|---|
| Smoked sheets | 100 |
| Carbon black | 50 |
| Zinc oxide | 3 |
| Stearic acid | 2 |
| Hexamethylenetetramine | 0.75 |
| Sulfur | 2 |
| N-t-butyl-2-benzothiazolesulfenamide | 1.0 |
| Resorcinol derived resin described above | 5 |

Cellulose is pretreated by stirring vigorously with butadiene-styrene-vinyl pyridine terpolymer latex, 40% solids, and the coated cellulose filtered, dried and mixed with the other ingredients on a mill. After the cellulose is oriented in the matrix on the mill and the composite cooled to room temperature, green elongation is determined by cutting a sample along the axis of orientation ½ in. wide, 2 in. long, from a sheet about 60–70 mil thick and pulling it on an Instron tester at a loading rate of 10 in. per inch per minute. Cured properties are assessed after curing at 153° C. for 25 minutes. The cellulose present in the composite comprises Solka Floc aspect ratio 17 and hardwood cellulose aspect ratio about 150. The proportions are parts by weight of fiber, the latex bonding coat being disregarded in this instance. Tensile refers to tensile strength.

| Parts by weight | | Green elongation, percent | Tensile after cure, lbs./in.² | Elongation after cure, percent | Young's modulus after cure, lbs./in.² |
|---|---|---|---|---|---|
| Hardwood | Solka Floc | | | | |
| 75 | | 25–30 | 4,000 | 8 | 70,000 |
| 25 | 50 | 100 | 3,400 | 10 | 55,000 |

Addition of 35 parts by weight of RFL coated glass filament ½ in. long and 5–6 microns diameter to a similar matrix along with 40 parts by weight of hardwood cellulose similarly pretreated produces a composite having a green elongation of about 55% in the above described test. The glass in the matrix after processing is 0.1–0.2 mm. length. Tensile and Young's modulus after cure are 2800 and 54,000 p.s.i. respectively.

Incorporation of fiber into thermoplastic resins which can be processed similar to rubber is effected in the manner already described. Employing an emulsion resin rubber masterbatch identified as hot emulsion polymer of 80–85% bound styrene 100 parts by weight extended with 100 parts by weight of styrene butadiene copolymer rubber a composition is compounded comprising:

| | Parts by weight |
|---|---|
| Resin rubber masterbatch | 100 |
| Latex coated hardwood cellulose | 50 |
| Nylon ½ in. RFL dipped | 15 |
| Carbon black | 50 |
| Silica | 15 |
| PAPI | 2.5 |
| Zinc oxide | 3 |
| Stearic acid | 2 |
| Sulfur | 1 |
| N-t-butyl-2-benzothiazolesulfenamide | 2 |

The hardwood cellulose is treated with styrene butadiene copolymer latex, filtered, allowed to dry, mixed with other ingredients and directionally oriented to produce the composition described. The composite is cured by heating in a press for 35 min. at 153° C. The aspect ratio of the hardwood cellulose in the cured composite is about 100. The physical properties of the vulcanizate in the direction of test in degrees with respect to the principal direction of fiber orientation are as follows:

| Direction of test, degrees | Tensile strength at break, lbs./in.² | Ultimate elongation, percent | Young's modulus, lbs./in.² |
|---|---|---|---|
| 0 | 4,108 | 3.1 | 256,800 |
| 90 | 1,412 | 59.0 | 89,875 |

It will be appreciated that bonding of the fiber to matrix is less important if the modulus of the matrix is comparable to the modulus of the fibers. Also, the fibers may, if desired, be admixed before treating to reduce fiber to fiber interaction instead of treating the fibers separately and admixing them in the matrix. Preadmixture, for example, in a latex coating step is satisfactory. Whether the cellulose used is bleached or unbleached is a matter of choice insofar as the modulus and tensile properties of the composite are concerned.

The composites herein described are especially useful as reinforcing tread plies of pneumatic tires. The short fiber composite may constitute the sole reinforcing tread ply of a pneumatic tire or may be a component of a reinforcing tread ply assembly. Other components may include rubber reinforced with continuous synthetic organic cords, glass cords, or wire cords. Wire cords include brass coated steel and uncoated stainless steel. If desired, additional strength and stiffness can be imparted to a short fiber composite by adding a 1- to 3-inch wide band of continuous organic or steel cord, with little or no matrix material, under or over a short fiber reinforcing tread ply of the described discontinuous cellulose composites. Two or more short fiber composites may be combined to form a laminated short fiber structure and of course layers of directionally oriented short fiber composites may be superimposed at any desired angle.

Reinforcing members between the tread and carcass are widely used in pneumatic tires. Thus, many tires now feature a circumferential belt or breaker assembly. In a radial ply tire, where the carcass cords cross the circumferential center line of the tire at an angle approximately 90°, which angle in practice may fall within the range of 70–90°, the assembly is usually called a belt. It is also called a belt in a bias ply tire when the cord angle is significantly different, say on the order of 5–10°, from the cord angle of the carcass. The assembly is called a breaker when present in a bias ply tire where the cords pass through the center line at a more acute angle and the breaker cord angle is of similar magnitude to the cord angle of the carcass. This belt or breaker assembly is a member between the carcass and tread which comprises one or more endless reinforcing bands or strips and is sometimes referred to as a tread ply to distinguish from ply member extending from bead to bead.

Conventional tire manufacture in the U.S. is a one-stage process in which the complete tire is first assembled in the form of a hollow cylinder. The carcass plies are wrapped about a collapsible drum, and if a breaker or belt is desired it is placed over the carcass before the tread and sidewall stock are applied. The cylindrical green tire is removed from the drum and the tire is shaped and expanded radially to its final diameter in steps associated with the curing process, the final shaping and curing taking place in a tire mold. This conventional process is particularly applicable to the manufacture of bias ply tires where the carcass cords usually pass through the crown at an angle of about 25–60° in the cured tire. The cord angle in the breaker is within a similar range and the breaker can expand along with the remainder of the tire because of the high angle of the breaker cord.

On the other hand, a low angle of breaker cords is more desirable, and for belts of radial tires a low cord angle in the belt is necessary for lateral stability. The belt in a radial tire receives support from the carcass essentially in only a radial direction and higher modulus is required than in a bias breaker. Belts which expand to a low cord angle have been constructed but an unacceptably low belt modulus generally results from this construction. As a result, the construction of radial tires normally requires departure from the described conventional technique. For example, the belt may be applied after radial expansion of the green carcass so that it is applied in essentially its final form and the belt cord angle does not change due to expansion. The necessity for continuous cord belts wherein the cords are either completely circumferential or if at an angle pass unbroken from one side of the belt to the other, have posed difficulty and expense to the radial tire maker but, heretofore, the strength and modulus of fiber composites without continuous cords have been deficient for belt and breaker use.

If the belt or breaker assembly contains no continuous cords but only discontinuous fiber, the required expansion of the assembly is not necessarily dependent upon changing the fiber angle during expansion of the tire. The assembly may be inserted at the desirable 0° of fiber orientation with respect to the circumfarential center line of the tire and remain unchanged during expansion of the tire to a toroidal form. Using the composites of our invention for the belt or breaker assemblies, tires can be built by conventional technique whether radial or bias. Furthermore, although a mixture of fibers is preferred, a single fiber may be used to prepare an expansible high modulus discontinuous fiber composite wherein the Young's modulus of the composite is more than ten times the Young's modulus of the matrix. For example, a composite is prepared wherein the matrix comprises the aforesaid Matrix E or G except that Matrix G is modified by reducing the carbon black to 25 parts by weight, the accelerator to 0.5 part by weight, the resin bonding agent to 4 parts by weight and increasing the sulfur to 3.0 parts by weight and the hexamethylene tetramine to 0.8 part by weight. The fiber is 30–40 parts by weight per hundred parts by weight of rubber hydrocarbon of hardwood cellulose pretreated by stirring vigorously with butadiene-styrene-vinyl pyridine terpolymer latex, 40% solids. The coated cellulose is filtered, dried and mixed with other ingredients in an internal mixer. The mixing temperature is about 70° C. The bonding ingredients added to Matrix E are 5 parts by weight of the above described resorcinol derived resin and 1 part by weight of hexamethylene tetramine. After the cellulose is oriented in the matrix and the composite cooled to room temperature, green elongation is determined in the manner described. Cured properties are assessed after curing at 153° C. for 25 minutes in a press.

| Matrix | Hardwood, parts by weight | Green elongation, percent | Tensile strength after cure (p.s.i.) | Elongation after cure, percent | Young's modulus after cure (p.s.i.) |
|---|---|---|---|---|---|
| E | 30 | 52 | 2,450 | 25 | 16,200 |
| F | 40 | 47 | 3,100 | 15 | 33,500 |
| G | 40 | 88 | 2,108 | 12.5 | 34,000 |

Illustrating the use of discontinuous fiber composite as an element of a pneumatic tire are two ply tires (4-ply rating) size G7814 having such composite either in a tread ply hereinafter referred to as a belt, or as carcass elements. As illustrative of discontinuous fiber composite belt construction, two ply polyester cord tires are built of 1000/3 polyester cord (27 ends per inch) coated with conventional coating stock. Discontinuous cellulose rubbercomposite is used in the belt. The tires, all built by conventional one-stage construction technique, comprise air impervious interliner, a pair of axially spaced beads, a pair of sidewalls, a tread portion two plies of substantially inextensible cord reinforced carcass, a restrictive belt over the tread region and conventional tread. The tires are constructed on a conventional cylindrical building drum on which the uncured tire is completely assembled. The liner and two cord layers are applied to the drum. Bead cores with attached flipper strips, if desired, are placed on the marginal edges of cord layers and the cord layers turned thereover. The width of liner and plies depends, of course, upon whether construction is bias or radial and are cut standard to the curing mold. The belt and tread are then applied to complete the green tire. The belt is selected from a composition described below. The tensile strength and Young's modulus of the cured composites are recorded as well as the composition. The fibers in the belt are oriented at an average angle of substantially 0° with respect to the circumferential center line of the tire, and it is preferred that the average angle be within the range of 0°–30°.

| Composite No. | 64-23 | 64-26-A | 64-28-B | 64-27-A | 64-24-D |
|---|---|---|---|---|---|
| Styrene-butadiene copolymer rubber | | | | | f 68.8 |
| Natural rubber | 100 | 100 | 100 | 100 | 50 |
| Carbon black (FEF) | 50 | 50 | 50 | 25 | 50 |
| Zinc oxide | 5 | 5 | 5 | 3 | 3 |
| Stearic acid | 3 | 2 | 3 | 2 | 2 |
| N-1,3-dimethylbutyl-N'-phenyl-p-phenylenediamine | 2 | 2 | 2 | 2 | 2 |
| Coated cellulose fiber | a 82.5 | b 82.5 | c 38.5 | e 44 | g 82.5 |
| Sulfur | 2.5 | 2.5 | 2.5 | 2.5 | 2.0 |
| N-t-butyl-2-benzothiazolesulfenamide | 0.75 | 0.75 | 0.75 | 0.75 | 1.0 |
| Hexamethylenetetramine | 1.0 | 1.0 | 1.0 | 0.75 | |
| Naphthenic type process oil | 5.0 | 5.0 | 5.0 | | |
| Resorcinol derived resin | | | | 5.0 | 3.75 |
| Cellulose fiber | | | | d 40 | |
| Polymeric 1,2-dihydro-2,2,4-trimethyl quinoline | | | | | 2 |
| Hexamethoxymethylmelamine | | | | | 1 |
| Tensile strength (p.s.i.) | 3,150 | 2,900 | 2,570 | 2,000 | 4,000 |
| Young's modulus (p.s.i.) | 57,500 | 56,000 | 61,000 | 38,500 | 60,000 | a Mixed fiber: 50 parts Solka Floc cellulose (containing fibers of average aspect ratio of about 17, unchanged after processing, coated with 5 parts of a mixture of the above described resorcinol derived resin and rubber from butadiene-styrene-vinyl pyridine polymer latex) and 25 parts hardwood cellulose coated with same mixture, average aspect ratio in the matrix being about 150.
b Mixed fibers, same as (a) but fibers mixed before coating.
c Single fiber, same hardwood as (a); 35 parts coated with 3.5 parts of same mixture.
d Solka Floc cellulose aspect ratio less than 10.
e Single fiber, same hardwood as (a); 40 parts coated with 4 parts of same mixture.
f Same rubber as Matrix E.
g Single fiber, same hardwood as (a); 75 parts coated with 7.5 parts of same mixture.

In all tires the belt splice is approximately a 25° angle with 2-inch overlap. For example, a two-ply belt is prepared by wrapping the belt composition twice around the building drum, the length being such that the end overlaps the starting point by 2 inches. The tread is built up directly on the building drum by a rubber extruder (Orbitreader) and the building drum collapsed and the assembled tire removed for shaping and curing. All tires are cured in a mold for 21 minutes. Expansion in the mold by the bladder is normal without visual irregularity. The belt composition of the green tires and widths are set forth below in tabular form and dimensions of the cured tires. All dimensions are inches. From bias tire 61671-1, the tread is removed and the dimensions of the cured belt found to be 5¼ to 5½ inches wide and 0.095 inch thick.

BIAS-BUILT GREEN TIRE

| Tire No | 61771-3 | 61671-2 | 61771-2 | 61771-1 | 61671-1 |
|---|---|---|---|---|---|
| Belt composition | None | 64-23 | 64-28-B | 64-27-A | 64-26-A |
| Belt plies, No | do | 2 | 2 | 2 | 2 |
| Thickness of each belt ply | | 0.057 | 0.057 | 0.057 | 0.057 |
| Belt width | | 8 | 6.5 | 6.5 | 6.5 |

RADIAL-BUILT GREEN TIRE

| Tire No | R-1 | R-2 | R-3 |
|---|---|---|---|
| Belt composition | 64-23 | 64-28-B | None—control. |
| Belt plies, No | 2 | 3 | None. |
| Thickness of each belt ply | 0.057 | 0.057 | |
| Belt width | 6.0 | 6.0 | |

BIAS-BUILT CURED TIRES INFLATED 24 p.s.i.

| Tire No. | 61771/3 | 61671/2 | 61771/2 | 61771/1 |
|---|---|---|---|---|
| Belt composition | (1) | 64-23 | 64-28-B | 64-27-A |
| Circumference, initial | 83-6/8 | 84-5/16 | 84-1/8 | 84-7/8 |
| Circumference, after 24 hrs | 83-15/16 | 84-5/16 | 84-5/16 | 84-15/16 |
| Tread radius, initial | 13-1/2 | 15 | 15 | 10-1/2 |
| Tread radius after 24 hrs | 13-1/2 | 14-1/2 | 15 | 10-1/2 |
| Section width | 8-3/16 | 8-1/8 | 8-1/16 | 8-1/16 |

[1] None—control.

RADIAL BUILT CURED TIRES INFLATED 24 p.s.i.

| Tire No. | R-1 | R-2 | R-3 [1] |
|---|---|---|---|
| Belt composition | 64-23 | 64-28-B | (2) |
| Circumference, initial | 87-5/16 | 86-3/16 | |
| Circumference after 24 hrs | 87-12/16 | 86-11/16 | |
| Tread radius, initial | 13 | 14 | |
| Tread radius after 24 hrs | 10 | 11-1/2 | |

[1] Inflated 10 p.s.i., 3 ply radial rayon cord carcass, 205R14.
[2] None—control.

Illustrative of the use of directionally oriented discontinuous unregenerated cellulose fiber composites as carcass elements are tires in which the carcass is composed of 2 plies, each 0.065 in. thick of composite 64–24–D in radial construction built by the described one-stage technique. Thus, the fibers are oriented in essentially a direction 90° with respect to the circumferential center line of the tire. The belt assembly is a two ply brass plated steel wire belt (12 brass plated wire cords/inch), the first ply of which is 6 inches wide and the second 5 inches wide. The belt cord angle after expansion is about 33° with respect to the circumferential center line of the tire. The tire expands in the mold without difficulty. Except for a chafer strip the carcass is cordless, but the tire contains the usual beads.

Illustrative of the use of directionally oriented discontinuous unregenerated cellulose fiber composites as components of a tire cordless except for the beads, chafer and if desired, a cord reinforced flipper, are tires composed of the aforesaid carcass of composite 64–24–D, beads, a restrictive belt of composite 64–23 and the usual tread and sidewalls. The tire expands in the mold without difficulty.

The construction of tires in which the belt or breaker assembly comprises a member reinforced with short fiber as one or more plies of the assembly and a member reinforced with cord running from edge to edge thereof as other plies of the assembly is well known and it will be appreciated that the short fiber reinforced composites described herein are admirably suited for use as the short fiber reinforced member of such assemblies.

Although the invention has been illustrated by typical examples, it is not limited thereto. Changes and modifications of the examples of the invention herein chosen for purposes of disclosure can be made which do not constitute departure from the spirit and scope of the invention.

The embodiments of this invention in which an exclusive property or privilege is claimed are defined as follows:

1. A composition comprising a vulcanizable elastomeric matrix having dispersed therein 7% to 75% by volume of a mixture of discontinuous fiber filaments 10% to 90% by weight of which is unregenerated cellulose fiber having an average aspect ratio of 20–350 and 90% to 10% by weight of which is fiber filament having an aspect ratio within the range of 10–3000 the average width of said fibers either differing by at least 10 microns or the average length differing by a factor of at least two.

2. A composition comprising a vulcanizable elastomeric matrix having dispersed therein directionally oriented mixture of discontinuous fiber filament a first component of said mixture being 25–100% by weight of the matrix of unregenerated wood cellulose of average aspect ratio 20–200 and a second component being 5–75% by weight of the matrix of fiber filament of average aspect ratio 10–2500 either of average width differing by at least 10 microns from the average width of the first component or average length differing by a factor of at least two from the first component.

3. Composition of claim 2 which contains fiber bonding ingredients.

4. Composition of claim 3 wherein the second component is steel of width within the range of 3–5 mils.

5. Composition of claim 3 wherein the second component is selected from the group consisting of nylon, polyester, rayon, polyacrylic and polyvinyl alcohol.

6. A composition comprising vulcanized elastomeric matrix having dispersed therein directionally oriented mixture of discontinuous fiber filaments the tensile strength of the composition being greater than the tensile strength of the composition containing the same total fiber loading of only one component of the fiber mixture, a first component being 25–100% by weight of the elastomer of unregenerated cellulose filament of average aspect ratio 20–350 and a second component being fiber filament either of average width differing by at least 10 microns from the average width of the first component or of average length differing by a factor of two or more from the first component.

7. Composition of claim 6 where the first component is wood cellulose having an aspect ratio of 50–200 and the second is selected from a group consisting of nylon, steel, rayon, polyester, asbestos and cotton and the fiber is bonded to the matrix.

8. Composition of claim 7 wherein the second component is cotton and is 10–50% by weight of the wood cellulose.

9. A composition comprising an unvulcanized diene rubber matrix having dispersed therein 25–150% by weight of the rubber of directionally oriented mixture of discontinuous fiber filaments, one component of said mixture being unregenerated cellulose fiber filament of 10–50 aspect ratio and a second component being fiber filament of aspect ratio 100–3000 and the fiber is bonded to the matrix.

10. Composition of claim 9 wherein both components are unregenerated cellulose, the first having an aspect ratio of 10–40 and the second an aspect ratio of 80–150.

11. Composition of claim 9 having a longitudinal green elongation of at least 30%.

References Cited

UNITED STATES PATENTS

| 1,223,692 | 4/1917 | Halsey | 260—741 |
|---|---|---|---|
| 1,474,482 | 11/1923 | Lahey | 260—741 |
| 1,675,959 | 7/1928 | Rose | 260—741 |
| 1,982,024 | 11/1934 | Rose et al. | 260—741 |
| 1,993,276 | 3/1935 | Murphy et al. | 260—741 |
| 2,292,492 | 8/1942 | Thomsen | 57—162 |
| 2,548,757 | 4/1951 | Adams | 260—17.4 |
| 2,759,852 | 8/1956 | King | 117—138.8 |
| 2,180,906 | 11/1939 | Maywald et al. | 260—748 |
| 3,388,083 | 6/1968 | Kwok | 260—17.4 |
| 3,570,573 | 3/1971 | Marker et al. | 152—359 |
| 3,570,574 | 3/1971 | Marker et al. | 152—361 |
| 3,570,575 | 3/1971 | Marker et al. | 152—361 |

FOREIGN PATENTS

| 1,166,876 | 10/1969 | Great Britain. |
|---|---|---|
| 1,525,111 | 4/1968 | France. |

ROBERT F. BURNETT, Primary Examiner

L. T. KENDELL, Assistant Examiner

U.S. Cl. X.R.

152—357, 361; 161—162, 170; 260—9, 17.4 CL, 746, 762

UNITED STATES PATENT OFFICE
CERTIFICATE OF CORRECTION

Patent No. 3,709,845                                    Dated January 9, 1973

Inventor(s) Kamel Boustany and Aubert Y. Coran

It is certified that error appears in the above-identified patent and that said Letters Patent are hereby corrected as shown below:

Col. 1, line 35 cancel "of" and in place thereof insert --with--;
    line 53 "obtatinable" should read --obtainable--;
    line 54 "loading" should read --loadings--.

Col. 2, line 24 --cellulose-- omitted before "fiber";
    line 54 cancel "fibers" and in place thereof insert
    --fiber--.

Col. 3, line 22 cancel "advantage" and in place thereof insert
    --average--;
    line 67 insert a comma --,-- after "reached" and "loading".

Col. 4, line 21 "weigh" should read --weight--;
    line 62 cancel the comma "," after "microns" and "aspects"
    should read --aspect--;

Col. 5, lines 6-7 insert --parts by weight-- after "1.5" and
    after "2.5";

Col. 6, line 17 "bread" should read --break--;
    line 43 insert --a-- after "in" and --mixer-- after
    "Brabender";
    line 48 cancel "An" and in place thereof insert --As--.

(Page 1 of 2)

UNITED STATES PATENT OFFICE
CERTIFICATE OF CORRECTION

Patent No. 3,709,845          Dated January 9, 1973

Inventor(s) Kamel Boustany and Aubert Y. Coran

It is certified that error appears in the above-identified patent and that said Letters Patent are hereby corrected as shown below:

Col. 8, line 25 "af" should read --of--;
line 43 delete "percent" after "Tensile strength at break" in the heading and insert --percent-- after "Elongation at break" in the next column of the table.

Col. 10, line 23 "penumatic" should read --pneumatic--

Signed and sealed this 20th day of November 1973.

(SEAL)
Attest:

EDWARD M. FLETCHER, JR.
Attesting Officer

RENE D. TEGTMEYER
Acting Commissioner of Patents